(No Model.)
W. I. BUNKER.
WHEEL.
No. 466,598. Patented Jan. 5, 1892.
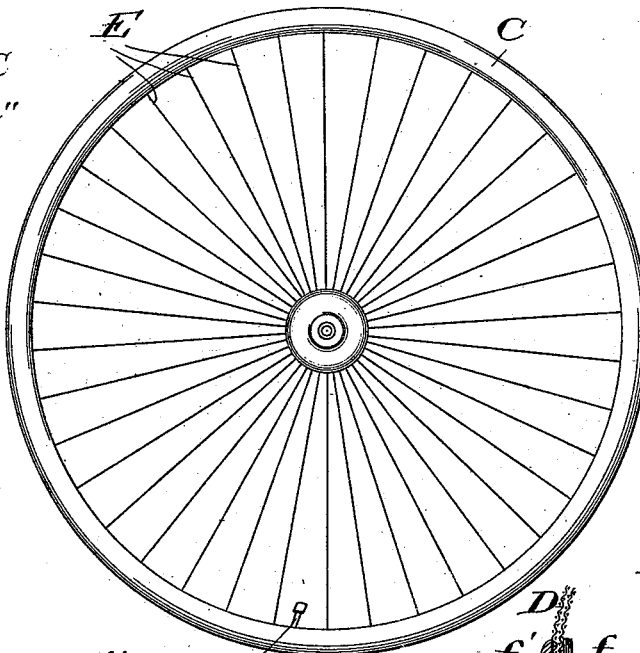
Fig. 1.
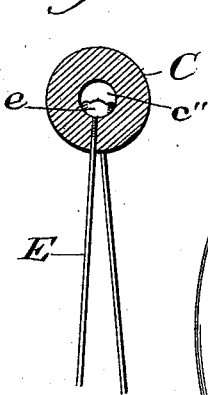
Fig. 2.
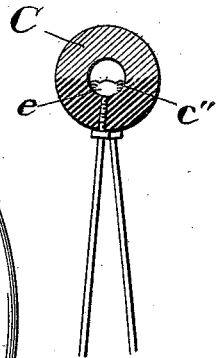
Fig. 3.
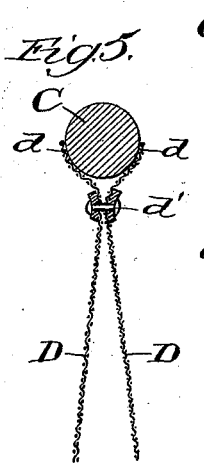
Fig. 5.
Fig. 6.
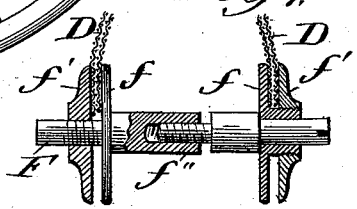
Fig. 7.
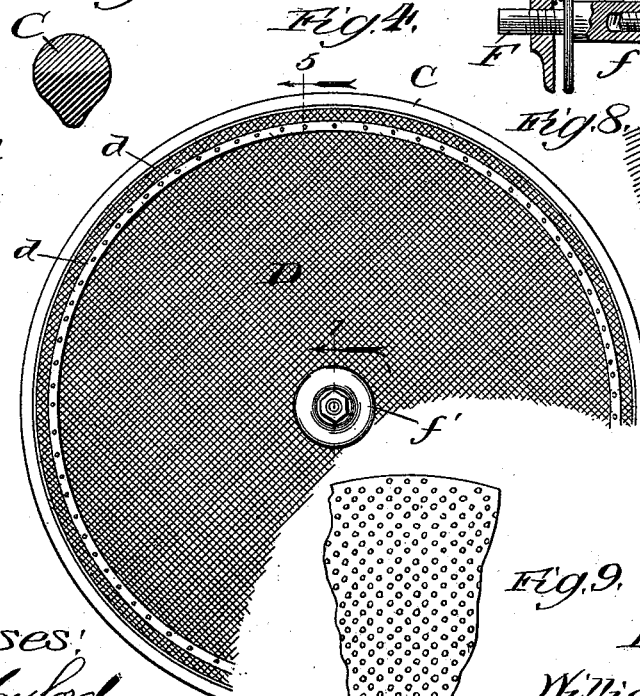
Fig. 4.
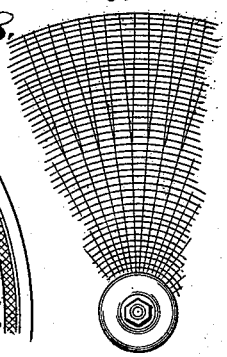
Fig. 8.
Fig. 9.
Witnesses:
Chas. Gaylord.
Clifford A. White.
Inventor:
William I. Bunker
By Banning & Banning & Payson
Attys

UNITED STATES PATENT OFFICE.

WILLIAM I. BUNKER, OF LA GRANGE, ILLINOIS.

WHEEL.

SPECIFICATION forming part of Letters Patent No. 466,598, dated January 5, 1892.

Application filed July 27, 1891. Serial No. 400,825. (No model.)

*To all whom it may concern:*

Be it known that I, WILLIAM I. BUNKER, of La Grange, Cook county, Illinois, have invented a new and useful Improvement in Wheels, of which the following is a specification.

The object of my invention is to make a simple economical wheel for bicycles or similar vehicles; and the invention consists in the features and combinations hereinafter described and claimed.

In the accompanying drawings, Figure 1 is a side elevation of my improved wheel, showing the spokes secured directly to the tire; Fig. 4, the same broken, showing a disk formed of wire-netting; and Figs. 2, 3, 5, 6, 7, 8, and 9, detail views of parts.

A is the wheel; B, the hub thereof; C, the tire; $c$, the periphery thereof; $c'$, the rim thereof, and $c''$ the central longitudinal hole or cavity therein for a pneumatic tire; D, disks between the hub and tire; $d\,d$, the flaring ends thereof adapted to receive and hold the tire, and $d'$ a rivet holding two of the disks together near their outer edge or circumference; E, spokes, and $e$ nuts at the outer ends thereof; F, a shaft or axle for the wheel, formed of two parts; $f$, a collar on the shaft; $f'$, a nut screwed onto the end of the shaft; $f''$, the screw mechanism for securing the two parts of the shafts together, and H an inflating-tube.

In making my improved wheel I provide a central hub, from which spokes radiate outwardly after the usual manner; but instead of using a rim or felly at the outer edge I attach the tire directly to the spokes or disks, as hereinafter described. I prefer to make the tire of rubber of large diameter; but it may be made of any suitable material or in any suitable size or form. A tire formed of rubber of small diameter does not have sufficient resistance to retain its position, and hence has to be held in place by a separate rim or felly; but when the tire is made of rubber of large diameter the rubber becomes sufficiently rigid after being drawn toward a common center to hold itself in place in ordinary bicycle or similar wheels. I also prefer to form the tire of hard rubber at the inner side, which I call the "rim," and of softer rubber at the outer side, which I call the "periphery." This difference in density of the rubber increases its resisting qualities, and thus enables smaller-sized tires to be used. When a pneumatic tire is to be used, it is formed with a suitable longitudinal hole or cavity for inflating, and a tube through which air or gas may be introduced communicates with this hole or cavity.

I prefer to secure the tire directly to the spokes; but, if desired, one or more disks of substantially the same diameter as the wheel, excepting the tire, may be used. As shown, two of these disks are used, one at each side of the wheel, and I prefer to use them in this way. I also prefer to form the disks of wire cloth or netting, and in some cases the netting may be so woven as to have one set of wire strands radiate from the hub while the other set encircles it. When formed in this way, a single sheet will be sufficient for all ordinary purposes; but whenever desired a double sheet may be used, as shown. As shown, each of the disks is formed with a flaring edge at its outer portion or circumference, so that when the two are brought and secured together these flaring edges form a suitable channel or cavity to receive and hold the tire.

The tire may be secured to the disks by its own elasticity or by cementing, or, no disk being used, it may be secured to the hub by inserting the spokes directly through the rim of the tire and screwing them into a suitable nut on the inside thereof. The nut may be inserted, one for each spoke, before the two ends of the tire are secured together; or they may be formed in a suitable strip inside the tire and extend from one end to the other, this strip being provided with suitable screw-threaded holes or openings to receive the spokes.

In making an ordinary bicycle-wheel in which disks are used I prefer to mount the two portions of the wheel upon a suitable hub passing through their respective centers. As shown, this hub is formed of two parts adapted to be secured together by one screwing into the other; but any other suitable form of hub may be used. When the hub is formed of two parts, as shown, I mount a fixed collar upon one portion and a revoluble collar on the other, these collars being adapted to receive and laterally support the disks. Nuts being screwed onto the end of the hub and brought into close contact with the sides of the disks serve to secure the whole in place. The hub, being formed of two parts, one screwing into the other, is readily adjustable lengthwise, so as to draw the central portions of the disks outward to tighten them.

In thus describing the construction of the hub I use the term "disks" as meaning, broadly, the mechanism used to connect the rim and hub together, whether the same consist of a disk, spokes, or other parts.

The advantages of my invention are that it enables a wheel to be formed without any separate rim or felly for receiving or holding the tire; that it enables a wheel to be formed with an elastic tire, having its rim held at a fixed distance from the hub and its periphery adapted to yield under pressure, and, generally, that it enables a simple economical wheel to be constructed of greater elasticity than other wheels now in use.

As the essential feature of my invention consists in dispensing with a separate rim or felly for receiving and holding the tire and in making the rim of the tire rigid and its periphery yielding, it will of course be understood that I do not intend to limit my invention to special forms or details of construction; but on the contrary that I intend to vary the form and construction or to use equivalent members, as desired.

I claim—

1. As a new article of manufacture, a wheel comprising a hub, an elastic tire, and spokes radiating from the hub and having their outer ends secured to the tire, whereby the tire is held at a fixed distance from the hub, substantially as described.

2. As a new article of manufacture, a wheel comprising a hub, an elastic tire forming both a rim and periphery, and spokes radiating from the hub and having their outer ends secured to the tire, whereby the rim of the tire is held at a fixed distance from the hub and its periphery allowed to yield under pressure, substantially as described.

3. As a new article of manufacture, a wheel comprising a hub, a hollow elastic tire forming both a rim and periphery, the rim being of harder or denser material than the periphery, and spokes radiating from the hub and having their outer ends secured to the tire, whereby the rim of the tire is held at a fixed distance from the hub, substantially as described.

4. As a new article of manufacture, a wheel comprising a hub having two collars mounted thereon, two disks mounted on the hub outside the collars, nuts secured onto the hub to hold the disks in place, and an elastic tire secured to the disks, substantially as described.

5. As a new article of manufacture, a wheel comprising a hub formed of two parts secured together by screw mechanism, a collar mounted on each part, two disks mounted on the hub outside the collars, nuts screwed onto the hub to hold the disk in place, and an elastic tire secured to the disks, substantially as described.

6. As a new article of manufacture, a wheel comprising a hub, spokes radiating from the hub and entering a hollow elastic tire, and nuts inside the tire for securing and holding the spokes and tire together, whereby the rim of the tire is held at a fixed distance from the hub and its periphery allowed to yield under pressure, substantially as described.

7. As a new article of manufacture, a wheel comprising a hub, spokes extending from the hub, and a cushioned or inflated tire secured directly to the spokes, substantially as described.

8. As a new article of manufacture, a cushioned or inflated tire for wheels, forming both a rim and periphery of different degrees of hardness or density in cross-section, the harder portion forming the rim and the softer portion the periphery, whereby the rim of the tire may be held at a fixed distance from the hub and its periphery allowed to yield under pressure, substantially as described.

9. In combination with the hub and tire of a wheel, a disk formed of wire cloth or netting securing the hub and tire together, substantially as described.

10. In combination with the hub and tire of a wheel, two disks, one at each side of the wheel, formed of wire cloth or netting and securing the hub and tire together, substantially as described.

WILLIAM I. BUNKER.

Witnesses:
EPHRAIM BANNING,
GEORGE S. PAYSON.